United States Patent
Suttle et al.

(10) Patent No.: US 9,483,393 B1
(45) Date of Patent: Nov. 1, 2016

(54) DISCOVERING OPTIMIZED EXPERIENCE CONFIGURATIONS FOR A SOFTWARE APPLICATION

(71) Applicant: Amazon Technologies, Inc., Seattle, WA (US)

(72) Inventors: Ian C. Suttle, Tustin, CA (US); Timothy J. Berger, San Bernardino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/098,023

(22) Filed: Dec. 5, 2013

(51) Int. Cl.
*G06F 11/36* (2006.01)
(52) U.S. Cl.
CPC ................. *G06F 11/3692* (2013.01)
(58) Field of Classification Search
CPC ... G06F 11/3664; G06F 11/3668; G06F 8/71
USPC ........................................................ 717/124
See application file for complete search history.

(56) References Cited

U.S. PATENT DOCUMENTS

| | | | |
|---|---|---|---|
| 7,036,008 B2 * | 4/2006 | Raghavachari et al. | 713/1 |
| 7,127,705 B2 | 10/2006 | Christfort et al. | |
| 7,299,382 B2 | 11/2007 | Jorapur | |
| 8,776,021 B1 | 7/2014 | Suttle et al. | |
| 8,972,770 B1 * | 3/2015 | Odean et al. | 714/1 |
| 2006/0129892 A1 * | 6/2006 | Diaconu et al. | 714/38 |
| 2007/0234293 A1 | 10/2007 | Noller et al. | |
| 2009/0307763 A1 | 12/2009 | Rawlins et al. | |
| 2010/0268511 A1 * | 10/2010 | Kato et al. | 702/182 |
| 2011/0231821 A1 * | 9/2011 | Sahni et al. | 717/124 |
| 2011/0296384 A1 | 12/2011 | Pasternak | |

OTHER PUBLICATIONS

Office action for U.S. Appl. No. 13/491,410, mailed on Oct. 16, 2013, Suttle, "Application Experiment System", 69 pages.

* cited by examiner

*Primary Examiner* — Li B Zhen
*Assistant Examiner* — Daniel Wei
(74) *Attorney, Agent, or Firm* — Lee & Hayes, PLLC

(57) ABSTRACT

Technologies are described herein for performing experiments on a software application and identifying optimized experience configurations for the software application. An application experiment system receives an experiment configuration from a developer of the software application. Based on the experiment configuration, the application experiment system determines an experiment strategy and generates a set of experience configurations for testing. Users available to participate in the experiment are identified, and the set of experience configurations are allocated to user computing devices associated with the available users to configure instances of the software application executing on the user computing devices. Experiment data related to the execution of the instances of the software application are collected and analyzed by the application experiment system to identify the optimized experience configuration for the software application.

20 Claims, 9 Drawing Sheets

DISCOVERING OPTIMIZED EXPERIENCE CONFIGURATIONS FOR A SOFTWARE APPLICATION

BACKGROUND

In order to provide a better experience to software application users, developers might update or make changes to software applications by adding/changing features or modifying designs. When deployed to users, however, those updates or changes might not achieve the initially intended goal. For example, a change in the difficulty level of a game application designed to engage a user more in the game might lead to a reduction in the amount of time a user spends playing the game, which may be because the user finds the updated game too hard or too simple to play. To reduce the uncertainty of the impact that updates to a software application may have on users, experiments on the software application, such as "A/B" testing, may be employed to test the effects of changes to a software application on a group of users before applying the changes to the software application to all users.

Most of the existing tools for software application experiments support comparisons between two versions of a software application feature: a control version/variation, referring to the original version of the feature, and a test version/variation, referring to the new version of the feature. While these tools might be able to satisfy the needs for software application experiments where only two versions/variations of a feature are involved, they become less efficient when the number of variations of software application features gets larger. For example, to test more than two variations of a software application feature, the developer might have to run a software application experiment tool multiple times and manually select the variations to be tested each time. When the number of variations gets larger, the process might become even more cumbersome and time-consuming for the software application developer.

The disclosure made herein is presented with respect to these and other considerations.

DETAILED DESCRIPTION

Figure 1:
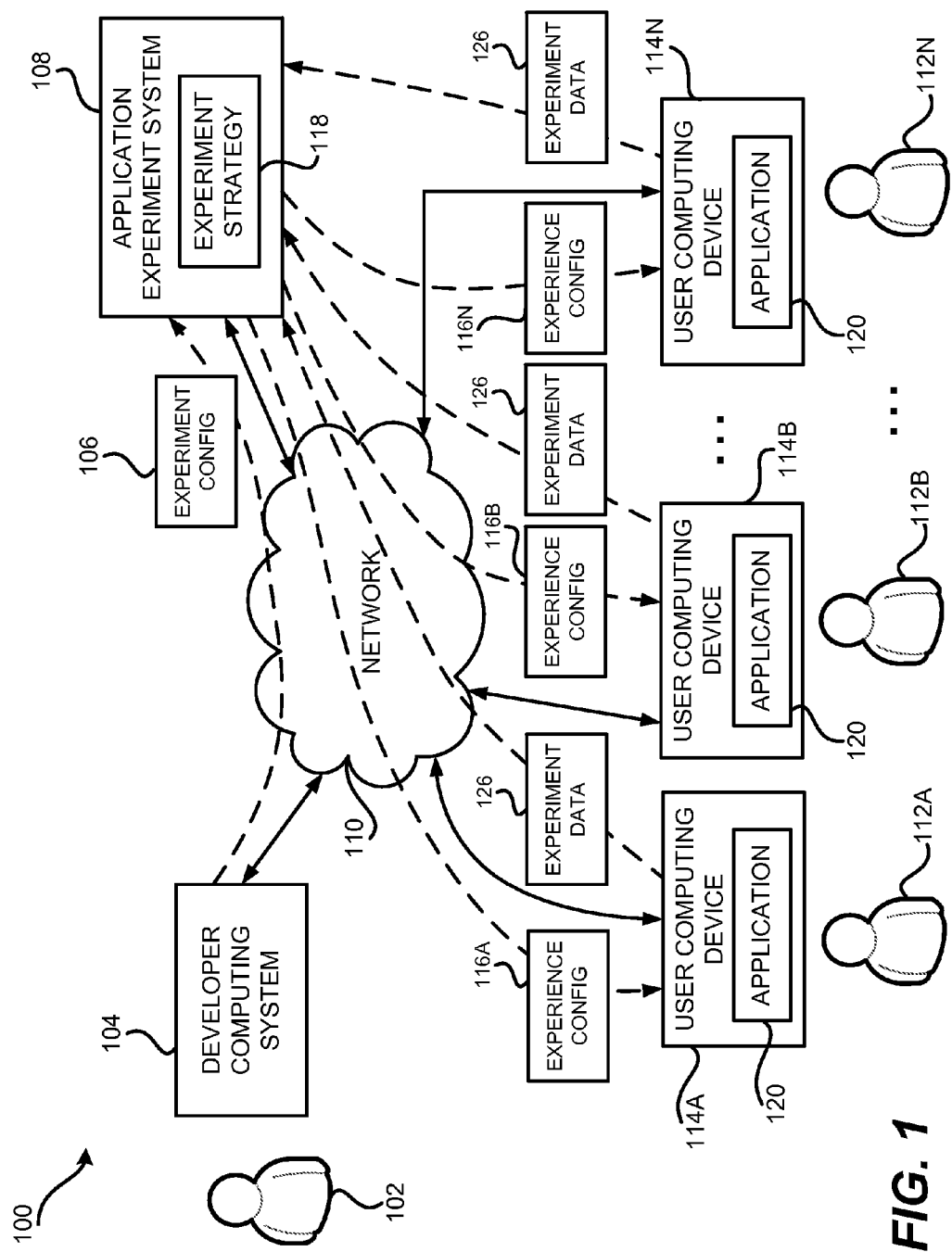
FIG. 1 is a system diagram showing aspects of one mechanism disclosed herein for performing experiments on a software application and identifying optimized experience configurations for the software application.

The following detailed description is directed to technologies for performing experiments on a software application and identifying optimized experience configurations for the software application. Utilizing the concepts and technologies described herein, experiments for testing multiple variations for various features or test factors of a software application can be automatically performed and optimized experience configurations can be identified without further intervention from the developer of the software application. The identified optimized experience configuration might then be automatically deployed to user computing devices and/or be sent to the developer of the software application for further action.

According to one aspect presented herein, a computer-implemented mechanism is disclosed for performing an experiment on a software application to identify optimized experience configurations for the software application. In particular, a developer of the software application might send an experiment configuration for the software application to an application experiment system. The experiment configuration might include one or more test factors for the software application, a set of test values available for each of the test factors, and an objective metric to be optimized. Based on the experiment configuration and other aspects such as the number of users available for the experiment, the application experiment system might determine an experiment strategy to be utilized to carry out the experiment.

The experiment might proceed by identifying a user computing device and allocating an experience configuration to an instance of the software application running on the user computing device. The user computing device might be identified through receiving, at the application experiment system, a request for executing the software application from the user computing device. The application experiment system might also select a user computing device according to the experiment strategy and proactively push the experience configuration to the selected user computing device. The experience configuration might be generated based on the experiment configuration, such as the available test values for each of the test factors. The experience configuration to be allocated to a particular user computing device might be determined dynamically or may be specified in the experiment strategy.

The allocated experience configuration might be utilized to configure the software application on the user computing device. While the software application is running at the user computing device, experiment data related to the execution of the software application might be collected by the application experiment system. The experiment data might include, but are not limited to, interactions of the user with the software application, operations or actions performed by the user during and/or after the execution of the software application, the time the user has spent using the software application, and other data. The application experiment system may then analyze the experiment data obtained from one or more user computing devices and identify an optimized experience configuration for the software application. Additional details regarding the various components and processes described above for performing experiments on a software application and identifying optimized experience configurations for the software application will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a system diagram that shows a system 100 for performing experiments on a software application and identifying optimized experience configurations for the software application according to embodiments disclosed herein. The system 100 might include an application experiment system ("AES") 108 for managing experiments on software applications and identifying the optimized experience configurations. According to embodiments, the application experiment system 108 might include web servers, application servers, network appliances, dedicated computer hardware devices, personal computers ("PC"), or any combination of these and/or other computing devices known in the art. The application experiment system 108 may be accessible through a network 110, which might be a local-area network ("LAN"), a wide-area network ("WAN"), the Internet, or any other networking topology known in the art that enables communications with the application experiment system 108.

According to embodiments, the application experiment system 108 might allow one or more software application developers 102 to define experiments and might administer the implementation of the experiments. In embodiments, an experiment on a software application might include a series of tests performed on instances of the software application, and each test may differ from one another in certain aspects. For example, these tests may differ in terms of application settings, also referred to herein as "experience configurations" 116 of the software application, such as parameter values, user interface layouts/colors, add-on features, embedded advertisements, incentives for user actions, and/or other aspects.

A developer 102 may initiate an experiment on a software application by sending an experiment configuration 106 to the application experiment system 108 through a developer computing system 104. The developer computing system 104 might be a computer utilized by the developer 102, which might be a server computer, a desktop or laptop personal computer, a tablet computer, a wireless telephone, a personal digital assistant ("PDA"), an e-reader, a game console, a set-top box, or any other computing device capable of connecting to the network 110 and communicating with the application experiment system 108. According to embodiments, the experiment configuration 106 sent from the developer computing system 104 might contain information that defines the experiment. By way of example, and not limitation, the experiment configuration 106 might include the software application to be tested, various features and/or feature values to be tested in the experiment, metrics for quantitatively measuring the experiment results, and other information that may be used to set up the experiment.

Based on the experiment configuration 106, the application experiment system 108 may generate a set of experience configurations. Each of the experience configurations may be allocated to one or more user computing devices and be used to configure an instance of the software application running on the corresponding user computing device. The allocation of the experience configurations to the user computing devices might be performed by following an experiment strategy 118 generated by the application experiment system 108. The generation of the experiment strategy 118 might be based on the experiment configuration 106 and other factors such as the number of users available to participate in the experiment.

As illustrated in FIG. 1, the application experiment system 108 may send experience configurations 116A-116N (which may be referred to individually as "an experience configuration 116" or collectively as "the experience configurations 116") to user computing devices 114A-114N (which may be referred to individually as "a user computing device 114" or collectively as "the user computing devices 114"). Each of the user computing devices 114 might be associated with a user 112A-112N (which may be referred to individually as "a user 112" or collectively as "the users 112") and might have an instance of the software application 120 running on it. The user computing device 114 might be a computer utilized by the user 112, which might be a server computer, a desktop or laptop personal computer, a tablet computer, a wireless telephone, a PDA, an e-reader, a game console, a set-top box, or any other computing device capable of connecting to the network 110 and communicating with the application experiment system 108.

Allocating the experience configuration 116 to the corresponding user computing device 114 might be triggered and implemented in various ways. For example, a user computing device 114 might have already had an instance of the software application 120 installed thereon. When the user 112 of the user computing device 114 wants to start the instance of the software application 120, he or she might submit a request for executing the software application 120 through the user computing device 114 to the application experiment system 108 or any other entities for managing the execution of the software application 120. Once the request is received, the application experiment system 108 may identify the user 112 as a participating user of the experiment and allocate an experience configuration 116 to the user computing device 114. In another scenario, the application experiment system 108 might proactively send the experience configurations 116 to several user computing devices 114. When the software application 120 is to be executed on the user computing devices 114, the allocated experience configuration 116 may then be utilized to configure the instance of the software application 120 on the corresponding user computing device 114.

In a further example, the user computing device 114 might not have the software application 120 pre-installed, and the user 112 of the user computing device 114 might send a request for a copy of the software application 120 to the application experiment system 108 or other responsible entities. In this case, a copy of the requested software application 120 along with or configured with an experience configuration 116 may then be sent to the user computing device 114 for execution. It should be appreciated that the above examples are provided by way of illustration only and should not be construed as limiting. Other ways of allocating the experience configuration 116 may be possible. For example, regardless of the instance of the software application 120 on the user computing devices 114, different versions of the software application 120 that implement the different experience configurations 116 might be distributed to user computing device 114. It should be further appreciated that while FIG. 1 illustrates an experience configuration 116 is sent to one user computing device 114, the experience configurations 116 may be, and typically are, sent to multiple user computing devices for testing.

Once the software application 120 is configured according to the experience configuration 116 and running on the user computing device 114, experiment data 126 related to the execution of the software application 120 may be collected by the application experiment system 108. By way of example, and not limitation, the experiment data 126 may include interactions of the user 112 with the software application 120, operations or actions performed by the user 112 during and/or after the execution of the software application 120, the time the user 112 spent with the software application 120, and other data. The collected experiment data 126 may then be transmitted to the application experiment system 108. According to embodiments, the application experiment system 108 might analyze the collected experiment data 126 to identify an optimized experience configuration 116 for the software application. Depending on a preference specified by the developer 102, the identified optimized experience configuration 116 may be automatically deployed to the user computing devices 114 and/or be sent to the developer 102 for further actions.

According to various embodiments, the experiment may be initiated by the developer 102 calling application program interfaces (APIs) provided by the application experiment system 108 and/or through user interfaces presented by the application experiment system 108 on the developer computing system 104. In another implementation, the functionalities of the application experiment system 108 might be provided as a service, such as a web service, that can be accessed by the developer computing system 104 to launch the experiment and to receive experiment results. Additional aspects regarding the application experiment system 108 can be found in U.S. patent application Ser. No. 13/491,410, filed on Jun. 7, 2012 and entitled "Application Experiment System," which is expressly incorporated herein by reference in its entirety Further details regarding the operation of the application experiment system 108 will be provided below with regard to FIGS. 2-4.

Figure 2:
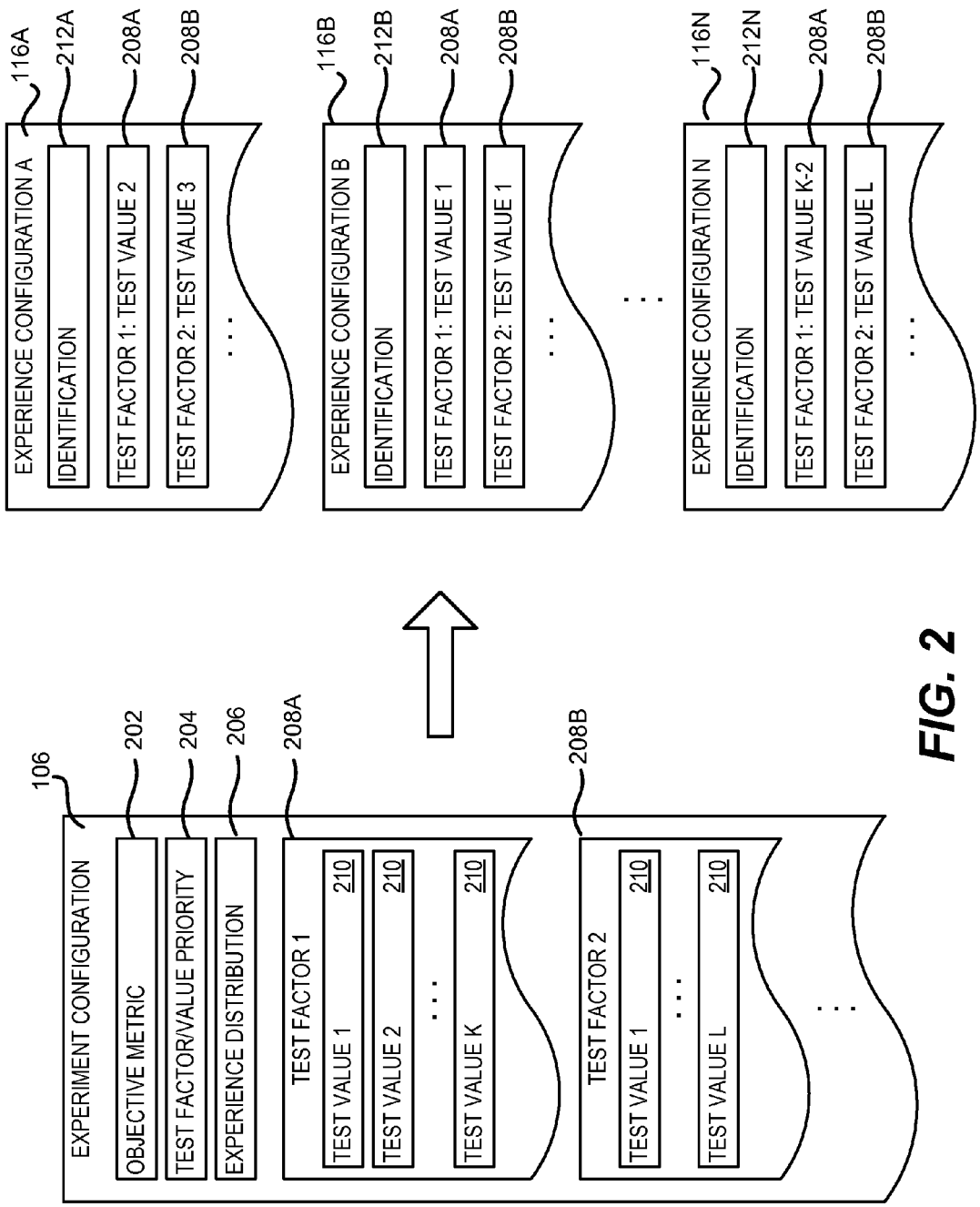
FIG. 2 is a data structure diagram illustrating a number of data elements contained in an experiment configuration and an experience configuration, according to embodiments presented herein.

Referring now to FIG. 2, one example data structure for implementing the experiment configuration 106 and the experience configuration 116 will be described. As briefly mentioned above, an experiment configuration 106 might contain information that defines various aspects of the experiment. In one embodiment, the experiment configuration 106 might include one or more features to be tested, called "test factors" 208A-208B (which may be referred to individually as "a test factor 208" or collectively as "the test factors 208"). Each test factor 208 may have several test values 210 to choose from. In the example illustrated in FIG. 2, test factor 1 208A has test value 1 to test value K available, and might adopt one of them as its value in a particular setting or configuration of the software application 120. Similarly, test factor 2 208B has test value 1 to test value L available and may adopt one of them as its value in a setting or configuration of the software application 120. It should be understood that the test value 210 might be quantitative, such as numeric values, or be qualitative, such as categorical data, like type, shape, etc.

Taking software game applications as an example, a test factor 208 might be the difficulty level of the game. The test values 210 for the test actor 208 may range from 1 to 10, which means a particular setting of the game may adopt one of the difficulty levels 1 to 10, such as a difficulty level of 5. Another test factor 208 may be the background color of a user interface of the game application 120, and the test values 210 for the background color test factor 210 might be "blue," "red," "brown," or "grey." One of these colors may be chosen for an instance of the game application 120. Other test factors 208 may include, but are not limited to, user interface layout, control button shape/color, add-on features, embedded advertisements, incentives for user actions, in-game purchase options, and others.

While FIG. 2 illustrates that each of the test values 210 for each test factor 208 is explicitly specified in the experiment configuration 106, it should be appreciated that other ways of representing the test values 210 for test factors 208 might be employed. For example, if a test factor 208 is a numerical variable, its corresponding test values 210 might be represented as a numerical range along with a step size. The set of test values 210 might then be generated based on the range and the step size. Continuing the above example of the game application with the difficulty level of the game being a test factor 208, the test values 210 for the test factor 208 might be represented as a range [1:10] along with a step size 1 in the experiment configuration 106. This representation of the test factor 208 and the test value 210 would have similar effects as directly listing the difficulty levels [1, 2, 3, . . . , 10] as the test values 210 in the experiment configuration 106.

As discussed above, based on the experiment configuration 106, the application experiment system 108 might generate one or more experience configurations 116 for testing. Each of the experience configurations 116 might include an identification 212 to uniquely identify the experience configuration 116. Each experience configuration 116 might also specify each of the test factors 208 selecting one of the test values 210 as its value. For example, in the experience configuration 116A shown in FIG. 2, test factor 1 208A takes test value 2 from the set of test values 210 associated with test factor 1. The test factor 2 208B adopts test value 3 from the set of test values 210 associated with test factor 2. After the experience configuration 116A is allocated and utilized to configure an instance of the software application 120, the values of the test factors 208A and 208B in that instance of the software application 120 will be set to the corresponding test values 210 specified by the experience configuration 116A. Other experience configurations 116 might be generated similarly.

According to one embodiment, the experience configurations 116 might be generated by exhaustively listing all the combinations of the test values 210 of the test factors 208, resulting in a complete experience configuration set. For example, in an experiment where the developer 102 defines two test factors 208, two test values 210 for one of the test factors 208 and three test values 210 for the other test factor 208, there would be six experience configurations 116 in a complete experience configuration set for the experiment, each experience configuration 116 including one combination of the test values 210 for the two test factors 208.

In another embodiment, a subset of the complete experience configuration set might be generated utilizing a portion of the test factors 208 and/or test values 210. As will be discussed in detail with regard to FIG. 4, in some scenarios, it may not be feasible to test all the experience configurations 116 in the complete experience configuration set. In such a situation, selecting and testing a subset of experience configurations 116 might be more reasonable. To facilitate the selection of the subset of experience configurations 116, the developer 102 might also include a test factor/value priority 204 field in the experiment configuration 106.

The test factor/value priority 204 field might specify priorities assigned to test factors 208 and/or test values 210. For instance, a test factor/value priority 204 may specify that test factor 1 208A shown in FIG. 2 has a higher priority than test factor 2 208B, and test value 1 and test value 2 for test factor 1 have a higher priority than the rest of the test values. As a result, experience configurations 116 that include (test factor 1:test value 1) or (test factor 1:test value 2) might be generated with a higher priority than other experience configurations 116, and thus might be tested first.

In order for the application experiment system 108 to identify the optimized experience configuration 116, an objective metric 202 that is to be optimized in the experiment might also be included in the experiment configuration 106. In the above game application example, the objective metric 202 might be the length of time a user spends on playing the game, and an experience configuration 116 that maximize the length of play time might be identified as the optimized experience configuration 116. Other metrics might be utilized as the objective metric 202 including, but not limited to, the percentage of users making a purchase if given the in-game purchase option, the percentage of users sharing the game to a friend, the percentage of users clicking on an advertisement link embedded in the game, and others. It should be appreciated that the selection of objective metric 202 might be related to the type of the software application 120 to be tested, and the purpose of the experiment. Thus, the objective metrics 202 used in experiments on different software applications might be different.

The experiment configuration 106 might also include various other data elements that might be utilized to define and carry out the experiment. For example, as illustrated in FIG. 2, the experiment configuration 106 may also include an experience distribution setting 206, which specifies the percentage of user computing devices 114 receiving a specific experience configuration 116. Other data, such as expected experiment duration, desirable user profiles for users participating in the experiment, and a secondary objective metric may also be included in the experiment configuration 106. It should be appreciated that additional data elements may be included in the experiment configuration 106 and experience configuration 116 beyond those described herein, and that not every data element described will be available for every experiment configuration 106 and experience configuration 116.

Figure 3:
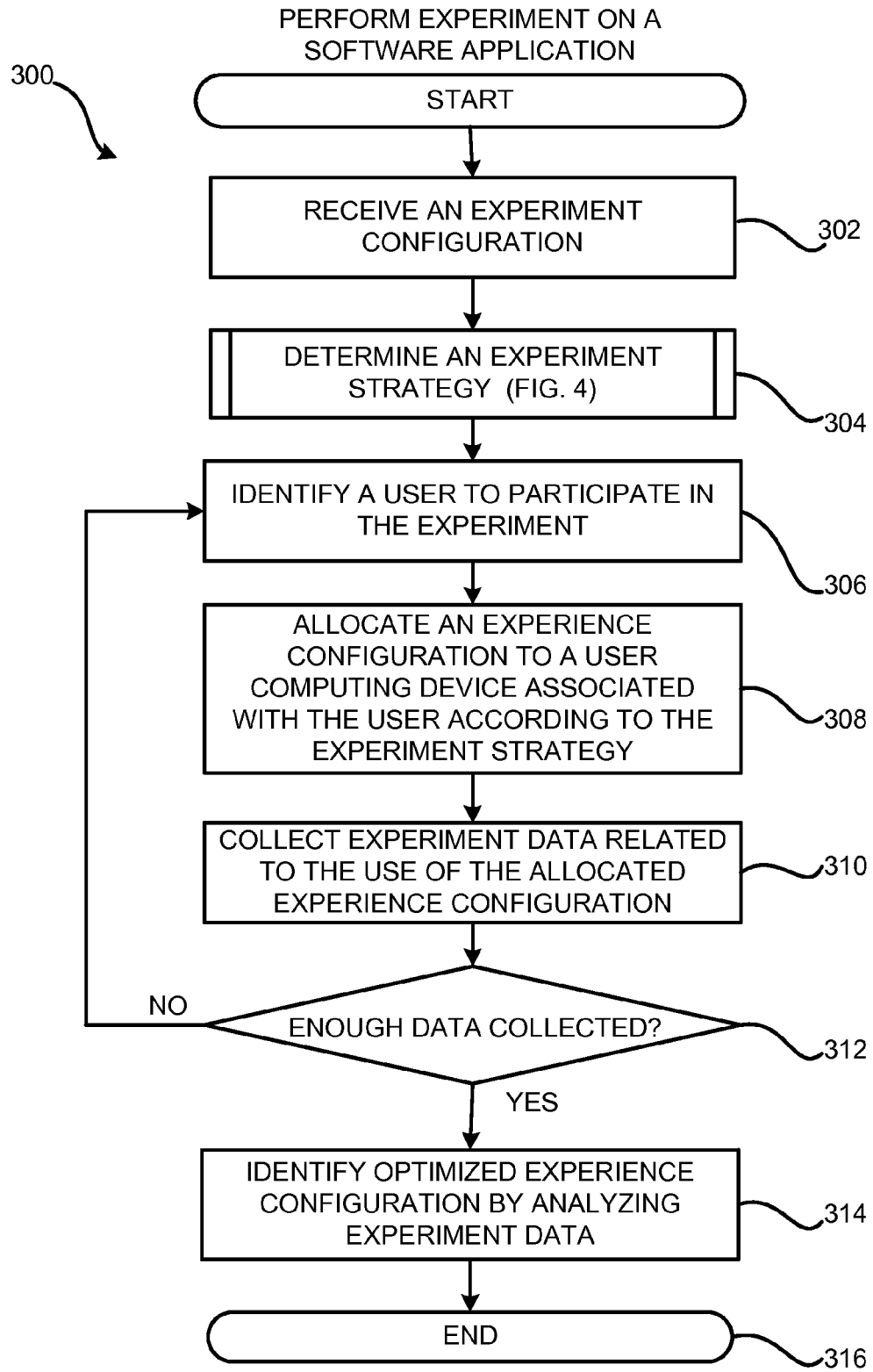
FIG. 3 is a flow diagram showing one illustrative routine for performing experiments on a software application and identifying optimized experience configurations for the software application, according to one embodiment disclosed herein.

FIG. 3 is a flow diagram showing aspects of one illustrative routine 300 for performing experiments on a software application 120 and identifying optimized experience configurations for the software application 120, according to one embodiment disclosed herein. In some implementations, the routine 300 is performed by the application experiment system 108 described above in regard to FIG. 1. It should be appreciated, however, that the routine 300 might also be performed by other modules and/or components or other entities in the system illustrated in FIG. 1.

It should also be appreciated that the logical operations described herein with respect to FIG. 3 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 300 begins at operation 302, where the application experiment system 108 receives an experiment configuration 106 for a software application 120 to be tested. As mentioned above, a developer 102 might send the experiment configuration 106 through a user interface presented by the application experiment system 108, by calling APIs exposed by the application experiment system 108 or by accessing a service implementing the functionalities provided by the application experiment system 108.

From operation 302, the routine 300 proceeds to operation 304, where an experiment strategy 118 might be determined based on the experiment configuration 106. The experiment strategy 118 might include information that can be utilized to guide the implementation of the experiment. Specifically, an experiment strategy 118 might include, but is not limited to, the experience configurations 116 to be tested in the experiment, the number of rounds that the experiment may be carried out, the set of experience configurations 116 to be included in each round of the experiment, a user assignment for allocating experience configurations 116 to user computing devices 114 associated with corresponding users 112, and other data. The experiment strategy 118 may then be utilized by the application experiment system 108 to allocate the experience configurations 116 to user computing devices 114. Additional details regarding determining the experiment strategy 118 are provided below with regard to FIG. 4.

From operation 304, the routine 300 proceeds to operation 306, where a user 112 is identified or selected to participate in the experiment. As discussed above, a user 112 might submit through a user computing device 114 a request for executing the instance of the software application 120 on the user computing device 114. Such a request might trigger the application experiment system 108 to identify the user 112 as a participating user of the experiment. Additionally, or alternatively, the application experiment system 108 might select a user who might be interested in executing the software application 120 on his/her user computing device 114. The selection of such a user might be based on, for example, a history of the user behavior or preference in requesting software applications, a profile of a user, and/or other information maintained by the application experiment system 108 or provided by the developer 102.

The routine 300 then proceeds to operation 308, where an experience configuration 116 might be allocated to the user computing device 114 associated with the identified participating user 112. If the user computing device 114 has an instance of the software application 120 installed thereupon, the application experiment system 108 might only send the experience configuration 116 to the user computing device 114. In another scenario, where the software application 120 might not have been installed on the user computing device 114, the allocation of the experience configuration 116 might include deploying the software application 120 to the user computing device 114 along with or configured using the experience configuration 116.

The allocation of the experience configuration 116 might occur in response to requests sent by the user 112 through the user computing device 114 or might be initiated by the application experiment system 108 to push the experience configuration 116, along with an instance of the software application 120 if necessary, to the user computing device 114. It should be appreciated that allocating the experience configuration 116 to a user computing device 114 described above is for illustration only, and should not be construed as limiting. Other ways of allocating the experience configuration 116, such as by sending to the user computing device 114 a link to retrieve the experience configuration 116 from a storage location, might also be employed.

The experience configuration 116 might be utilized by the user computing device 114 to configure the instance of the software application 120 to a specific setting defined in the experience configuration 116 upon execution. The user computing device 114 may then execute the software application 120 and the user 112 might perform various operations on the software application 120, such as playing a game if the software application 120 is a game application or reading a document if the software application 120 is a document viewer.

From operation 308, the routine 300 proceeds to operation 310, where the application experiment system 108 might collect experiment data 126 related to the use of the experience configuration 116, such as the execution of the software application 120 configured by using the experience configuration 116. As discussed above, the experiment data 126 might include interactions of the user with the software application, operations or actions performed by the user during and/or after the execution of the software application, the time the user spends on the software application, and other data.

From operation 310, the routine 300 proceeds to operation 312, where a determination is made as to whether enough experiment data 126 have been collected. In one embodiment, the collected experiment data 126 might be considered as enough if the experiment data 126 can provide statistically significant results, i.e., the objective metrics 202 obtained for different experience configurations 116 are not different because of random variations. There are various mathematical formulations known in the art to quantitatively define the statistical significance and to determine if a result is statistically significant. It is intended that this application include all such definitions and determinations of statistically significant.

If it is determined that the collected experiment data 126 is not enough to for analysis, the routine 300 returns back to operation 306, where another user might be identified to participate in the experiment. If it is determined at the operation 312 that the collected data is enough for analysis, the routine 300 proceeds to operation 314, where the experiment data 126 might be analyzed and an optimized experience configuration 116 might be determined. In one embodiment, the optimized experience configuration 116 might be defined as the experience configuration 116 that leads to a desired value of the objective metric 202. For example, if the objective metric 202 is the length of time a user spends on playing the game, the optimized experience configuration 116 might be determined to be the one, out of a set of experience configurations 116, that engages a user in playing the game for the longest period of time. In other examples, the optimized experience configuration 116 might be the one, out of a set of experience configurations 116, that results in the largest purchase rate of a product through an in-application purchase option, provides the highest rate of a user sharing the application with a friend, leads to the highest click-through rate of a link provided in the software application, or others. From operation 314, the routine 300 proceeds to operation 316, where it ends.

In another implementation, the routine 300 might also include a determination operation (not shown) for determining whether a time period specified by the developer 102 or otherwise determined by the application experiment system 108 has elapsed. If it is determined that the time period has not passed, the routine 300 would continue as normal; otherwise, the routine 300 would end with or without performing the operation 314 for identifying the optimized experience configuration 116. It should be appreciated that other additional operations might be added in routine 300 depending on the experiment configuration 106 and/or the experiment strategy 118.

Figure 4:
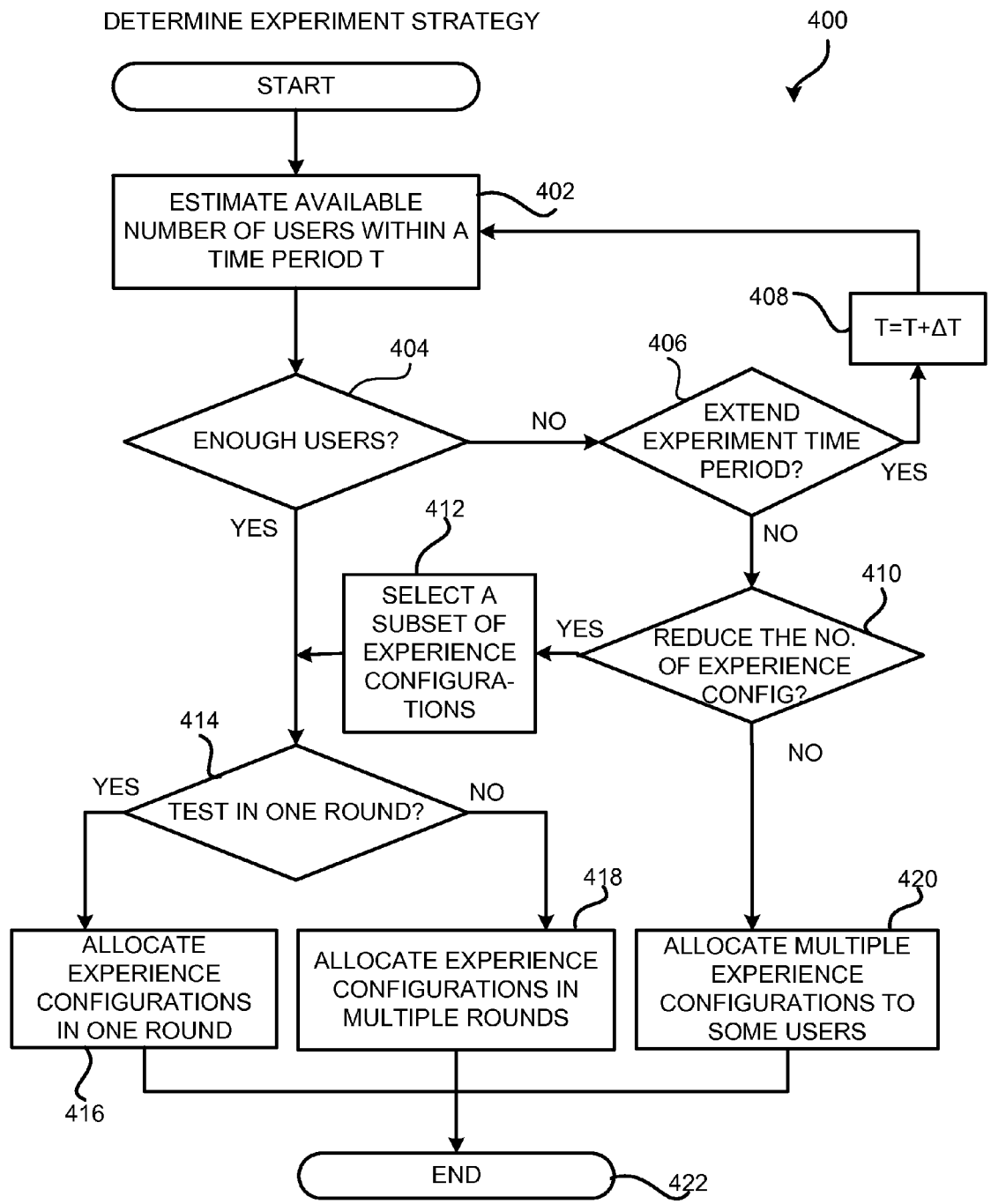
FIG. 4 is a flow diagram showing one illustrative routine for determining an experiment strategy for a software application, according to one embodiment disclosed herein.

FIG. 4 is a flow diagram showing a routine 400 for determining an experiment strategy 118 to be utilized in the experiment of the software application 120, according to one embodiment disclosed herein. In some implementations, the application experiment system 108 described above in regard to FIG. 1 may perform the routine 400. It should be appreciated that the routine 400 might also be performed by other modules and/or other entities in the system 100.

The routine 400 begins at operation 402, where the number of users available to participate in the experiment within a time period T might be estimated. The estimation might be performed based on a history of users requesting the software application 120 or similar software applications. Such a history might be provided by the developer 102 or obtained from an entity that is responsible for managing user requests for software applications. Thus, a user might be counted as an available user if, based on the history data, the likelihood that the user requests the software application 120 is high. In a further embodiment, a user might be considered as an available user if his/her profile matches the desirable user profiles for participating users provided in the experiment configuration 106, and his/her likelihood of executing the software application 120 is high.

The time period T for estimating the number of available users might be specified by the developer 102, for example, in the experiment configuration 106 as the time period during which the experiment expect to complete. Alternatively, or additionally, the time period T might be determined by the application experiment system 108 as a reasonable time period to finish the experiment.

From operation 402, the routine 400 proceeds to operation 404, where a determination is made as to whether the estimated number of users available for the experiment is large enough or not. In one embodiment, the estimated number of users might be considered as large enough if statistically significant results can be obtained based on the number of available users as discussed above. In another embodiment, the estimated number of user might be determined as large enough if it is higher than a pre-determined threshold specified by the developer 102, for instance, in the experiment configuration 106.

If, at operation 404, it is determined that the estimated number of users available for the experiment is large enough, the routine 400 proceeds to operation 414, where a further determination might be made as to whether the experiment is to be performed in one round or in multiple rounds. This determination might be based on the total number of experience configurations 116 to be tested, the number of concurrent tests supported by the application experiment system 108, and/or other factors. For example, if there are three experience configurations 116 to be tested, it might be efficient to test all three experience configurations 116 in one round. However, if there are more than 10 experience configurations 116 to be tested, testing these 10 experience configurations 116 in multiple rounds might be more manageable than testing them all in one round.

Figure 5:
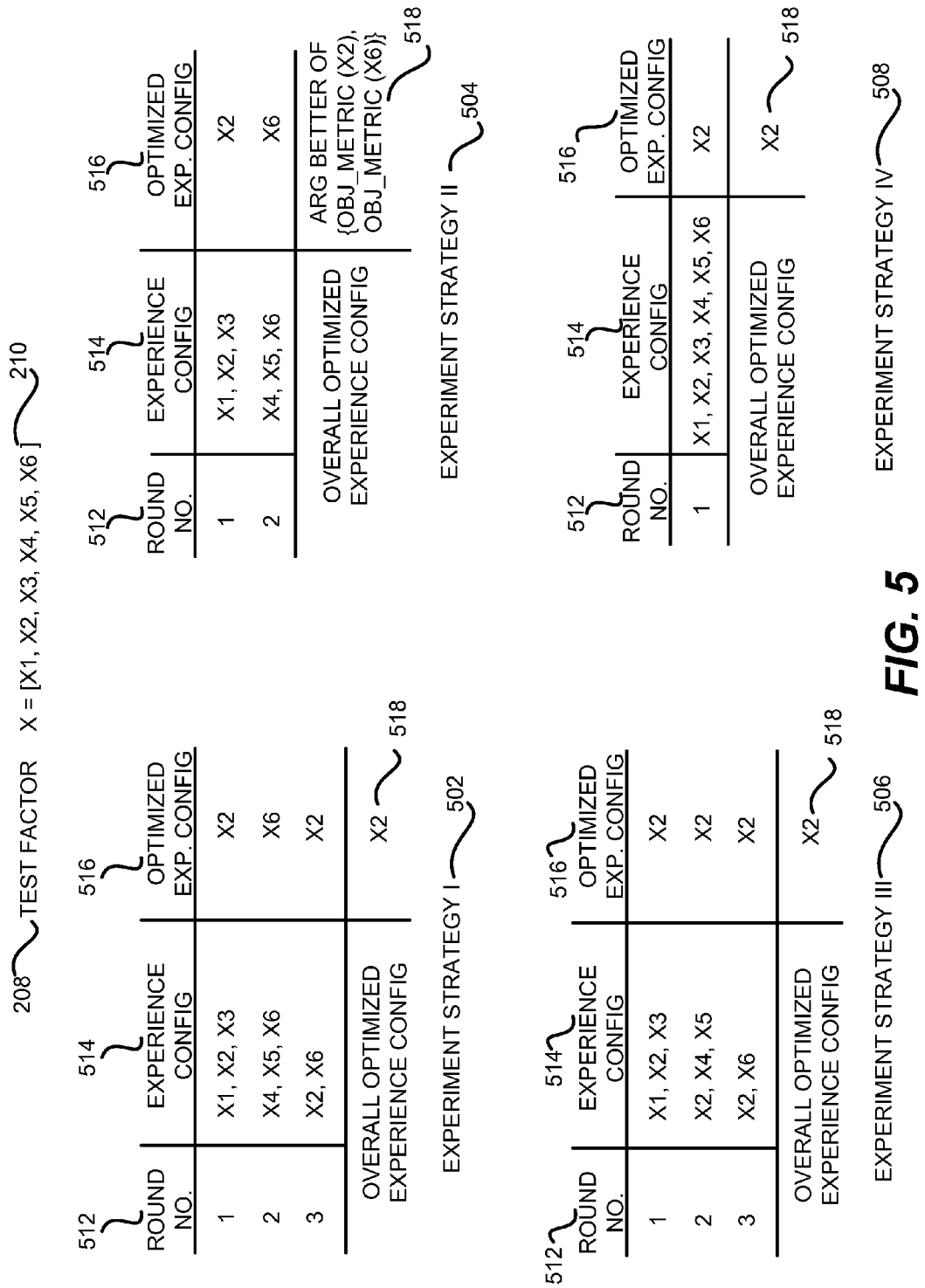
FIG. 5 is a diagram illustrating several example assignments of experience configurations to different rounds of an experiment in an experiment strategy, according to embodiments disclosed herein.

If, at operation 414, it is determined that the experiment is to be tested in one round, the routine 400 proceeds to operation 416 where an experiment strategy 118 might be generated to allocate the experience configurations 116 in one round. If, at operation 414, it is determined that the experiment is to be tested in multiple rounds, the routine 400 then proceeds to operation 418 where an experiment strategy 118 might be generated to allocate the experience configurations 116 in multiple rounds. The experiment strategy 118 might further include the specific experience configurations 116 to be tested in each round. FIG. 5 illustrates several example of assigning experience configurations 116 to different rounds of the experiments.

The example experiment shown in FIG. 5 has one testing factor X 208, and the testing factor X 208 has six test values 210: $\{x_1, x_2, x_3, x_4, x_5, x_6\}$. Each table shown in FIG. 5 corresponds to one possible experiment strategy 118: experiment strategy I 502, experiment strategy II 504, experiment strategy III 506, and experiment strategy IV 508. Each table contains a column 512 representing the round sequence number and a column 514 listing the experience configurations 116 to be tested in each round of the experiment. Since the example experiment shown in FIG. 5 only contains one testing factor X 208, the experience configurations 116 to be tested may be represented using the corresponding test values 210, as illustrated in FIG. 5. Each table further includes a column 516 listing the optimized experience configuration 116 obtained in each round, which might be considered as sub-optimized experience configurations, and an entry 518 representing the overall optimized experience configuration obtained for the experiment.

The experiment strategy I 502 illustrated in FIG. 5 represents one type of strategy for testing experience configurations 116 in multiple rounds. In this strategy, the experience configurations 116 might be separately tested in multiple rounds and optimized experience configurations 116 from each round might then be tested in an extra round to identify the overall optimized experience configuration 116. For example, in round 1 of the experiment strategy I 502, three experience configurations 116 might be tested: $\{x_1, x_2, x_3\}$ and $x_2$ might be identified as the optimized experience configuration 116 for round 1. In the second round, experience configurations 116 $\{x_4, x_5, x_6\}$ might be tested and $x_6$ might be identified as the optimized experience configuration 116 in round 2.

To determine an overall optimized experience configuration 116, a third round of experimentation might be performed by testing the optimized experience configurations 116 from previous rounds $\{x_2, x_6\}$. The overall optimized experience configuration 116 might be determined to be the optimized experience configuration 116 from the third round, for example, $x_2$ in the experiment strategy I 502. This extra round of experiment might help to eliminate the difference between different rounds caused by factors such as seasonality, or the day of the week. Alternatively, the overall optimized experience configuration 116 might be determined by comparing the objective metrics of the optimized experience configurations 116 from previous rounds of experiment without an extra round of experiment, as illustrated in the experiment strategy II 504. In this experiment strategy, the overall optimized experience configuration 116 might be determined to be the one resulting in a better objective metric.

In another embodiment, the experiment strategy 118 might select the optimized experience configuration 116 from one round to be part of the experience configurations 116 tested in an immediate next round, as illustrated in the experiment strategy III 506. In the experiment strategy III 506, the optimized experience configuration 116 identified in round 1, $x_2$, is placed in the second round for testing again along with other experience configurations 116, and is identified as optimized experience configuration 116 in round 2. As such, $x_2$ is tested again in round 3 and is determined to be the optimized experience configuration 116 in round 3. In this type of experiment strategy, the optimized experience configuration 116 from the last round of the experiment may be selected as the overall optimized experience configuration 116 listed in the entry 518.

Under the framework presented in FIG. 5, testing all the experience configurations 116 in one round, as might be specified in the strategy generated in operation 416, may be presented as experiment strategy IV 508 as shown in FIG. 5. Furthermore, it should be understood that in each round of the experiment, one of the experience configurations 116 might be identified as the control variation of the experiment and the rest might be treated as test variations. In some scenarios, the control variation might correspond to the default experience configuration 116 of the software application 120, in which no changes have been made. In other scenarios, the control variation might correspond to an experience configuration 116 that has been tested before, such as $x_2$ in round 2 of the experiment strategy III 506.

In another embodiment, the selection of the experience configuration 116 for a round of experiment might be determined based on the experiment data, such as the objective metrics calculated from the experiment data obtained from previous rounds. Using the game software application described above as an example, the selection of test values for succeeding rounds of experiments might be determined based on the change of the objective metric of the test variation compared with that of the control variation with default difficulty level. For example, in the first round of the experiment, a random test value, such as difficulty level 7, might be selected in a test variation for testing. If the objective metric, for example the length of play time, of the tested difficulty level 7 is shorter than that of the control variation with a default difficulty level, the difficulty level for the next round of experiment might be selected to be a value closer to the default difficulty level. The selection of the new difficulty level to be tested might also depend on how large the reduction in the length of play time. If the reduction is large, then the step size for selecting the test value for the next round of experiment might be larger; otherwise the step size might be smaller.

Figure 6A:
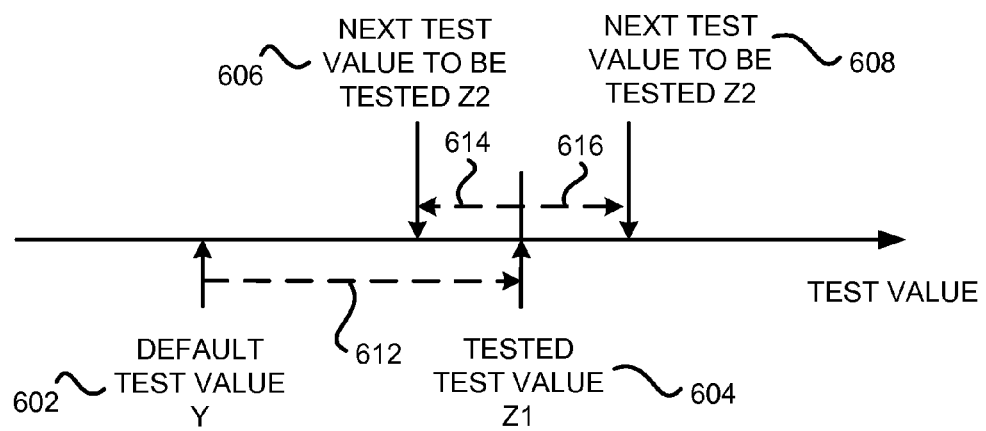
FIG. 6A is a diagram illustrating selecting a test value for a round of an experiment based on an objective metric obtained from a previous round of the experiment, according to embodiments disclosed herein.

Generally speaking, the selection of the test value for the next round of the experiment might depend on the sign and the rate of the change in the objective metric of the test variation compared with that of the control variation. As shown in FIG. 6A, if the test variation leads to a worse objective metric, the next test value to be tested Z2, might be selected along the negative direction 614 of the change 612 of the tested test value Z1 compared with the default test value Y. If the test variation leads to a better objective metric, the next test value to be tested Z2, might be selected along the positive direction 616 of the change 612 of the tested test value Z1 compared with the default test value Y. The step size for choosing the next metric value to be tested might be proportional to the rate of the change in the objective metrics. By selecting test values in this way, the application experiment system 108 might obtain the optimized experience configuration 116 without testing all the experience configurations 116 in the complete experience configuration set.

Figure 6B:
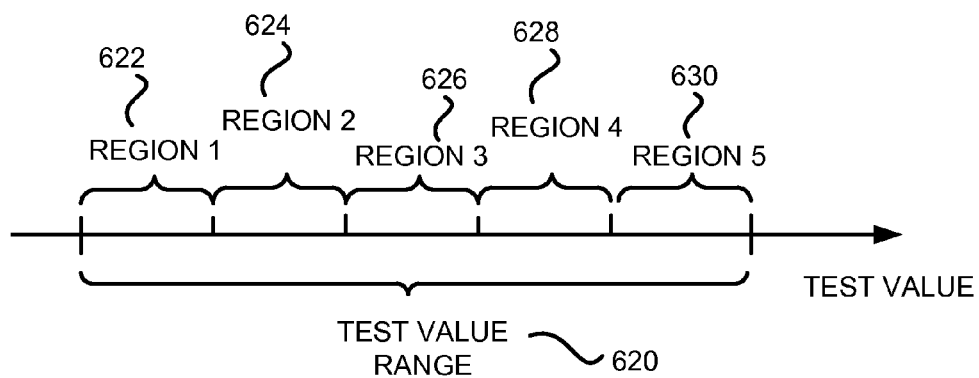
FIG. 6B is a diagram illustrating dividing a range of test values into multiple regions for testing in an experiment on a software application, according to embodiments disclosed herein.

In a further embodiment, each round of the experiment might be constructed to test multiple test values, as illustrated in FIG. 6B. In an experiment where the test values corresponds to a numerical range 620, such as the difficulty levels in the above game software application example, the numerical range might be divided into multiple regions 622-630, and one test value might be picked from each of the regions in one round of the experiment. Within each region, the test value might be selected in a similar way as described above and illustrated in FIG. 6A. A sub-optimized test value might be obtained for each region. The obtained sub-optimized test values from the multiple regions might be compared using their respective object metrics or be tested in an extra round of experiment to identify the overall optimized test value.

Referring back to FIG. 4, if at operation 404 it is determined that the estimated number of users available for the experiment is not large enough, the routine 400 proceeds to operation 406 where a further determination is made as to whether the developer 102 is willing to extend the time period of the experiment so that more users might be included in the experiment. Such information might be obtained from the developer 102 through the interaction of the developer 102 with a user interface presented by the application experiment system 108. Alternatively, or additionally, the developer 102 might pre-set his/her preference on extending the experiment time period in the experiment configuration 106.

When deciding whether or not to extend the experiment time period, there may be a tradeoff between the accuracy of the experiment results and the time length of the experiment. Generally speaking, the more users there are to participate in the experiment, the more accurate the experiment results would be, that is, the identified optimized experience configuration 116 would be more likely to be the true optimized experience configuration 116. To get more users involved in the experiment, however, typically requires a longer experiment time. On the other hand, to complete the experiment in a short time period, there may not be enough users available to participate in the experiment, which may lead to low accuracy of the experiment results.

While in general it might be preferred to get as many users as possible to be involved in the experiment at the expense of long experiment time, there might be situations where the application experiment system 108 might have to conduct the experiment with a limited number of users. For example, the total number of users for a software application 120 might be small in nature. The number of experience configurations 116 to be tested might be relatively large with respect to the number of users. The experiment might be a preliminary test that needs to be finished in a short time of period and the accuracy of the experiment results is less crucial. Depending on the specific situation a developer 102 might face, the developer 102 might instruct the application experiment system 108 to choose either reducing the number of experience configurations 116 to be tested or selecting some users to participate in the tests of multiple experience configurations 116. Reducing the number of experience configurations 116 to be tested might help to keep the user number for testing one experience configuration 116 at a desired scale, whereas selecting some users to participate in multiple tests might keep the number of tested experience configurations 116 unchanged by sacrificing the accuracy of the experiment results.

In FIG. 4, if it is determined that the experiment time period can be extended at operation 406, the routine 400 proceeds to operation 408, where the time period T might be expanded by an amount of ΔT. The routine 400 then returns back to operation 402. If it is determined that the experiment time period cannot be extended, the routine 400 proceeds to operation 410, where the application experiment system 108 might determine whether a smaller set of experience configurations 116 may be tested. The application experiment system 108 might make this determination based on information obtained from the developer 102 through a user interface presented to the developer 102. Alternatively, or additionally, the developer 102 might pre-set his/her preference on reducing the number of experience configurations 116 in the experiment configuration 106.

If, at operation 410, it is determined that the number of experience configurations 116 can be reduced, the routine 400 proceeds to operation 412, where the number of the experience configurations 116 might be reduced by selecting a subset of the experience configurations 116 for testing. In some embodiments, the selection of the subset of experience configurations 116 might be performed by randomly choosing experience configurations 116. In other embodiments, the selection might be performed based on instructions provided by the developer 102. For example, as discussed above, the experiment configuration 106 might contain a test factor/value priority 204 field, which specifies priorities assigned to the test factors 208 and/or test values 210. Based on the test factor/value priority 204, the application experiment system 108 might first select experience configurations 116 corresponding to the test factor/values with high priority to be included in the subset of experience configurations 116, and some experience configurations 116 corresponding to low priority test factor/values might not be selected. It should be understood that these examples are only illustrative and should not be construed as limiting. Other ways of selecting the subset of experience configurations 116 may be utilized. From operation 412, the routine 400 proceeds to operation 414, from which point the routine 400 proceeds as discussed above.

If, at operation 410, it is determined that the number of experience configurations cannot be reduced, the routine 400 proceeds to operation 420, where some user computing devices 114 might be allocated with multiple experience configurations 116 due to the insufficient number of available users. In one implementation, the multiple experience configurations 116 allocated to one user computing device 114 might be tested in separate rounds. In other words, the user might participate in multiple rounds of the experiment, and in each round his/her computing device 114 might receive a different experience configuration 116. It should be noted that by involving one user in multiple rounds of the experiment, the user's behavior might be influenced by the software application 120 that has been presented to the user before. As such, the obtained objective metric 202 might be biased, leading to inaccurate experiment results. From operation 420, operation 418 or operation 416, the routine 400 proceeds to operation 422, where it ends.

In embodiments, the generated experiment strategy 118 might also include a user assignment for allocating experience configurations 116 to user computing devices 114 associated with the corresponding users 112. In one implementation, the user assignment might be generated by randomly assigning the experience configurations 116 to available users. In another implementation, the user assignment might be obtained by utilizing the hash value based assignment method described in U.S. patent application Ser. No. 13/491,410, filed on Jun. 7, 2012 and entitled "Application Experiment System."

It should also be understood that the experiment strategy 118 might be dynamically updated based on current situations of the experiment. For example, the estimation of the available number of users might be adjusted as the experiment is being carried out. Based on the adjusted estimation, the determinations made at operations 404, 406, 410 and 414, as well as the operations following those determinations might be updated accordingly. It should be further appreciated that the process of generating experiment strategy 118 described in FIG. 4 is merely illustrative and that other implementations might also be utilized.

Figure 7:
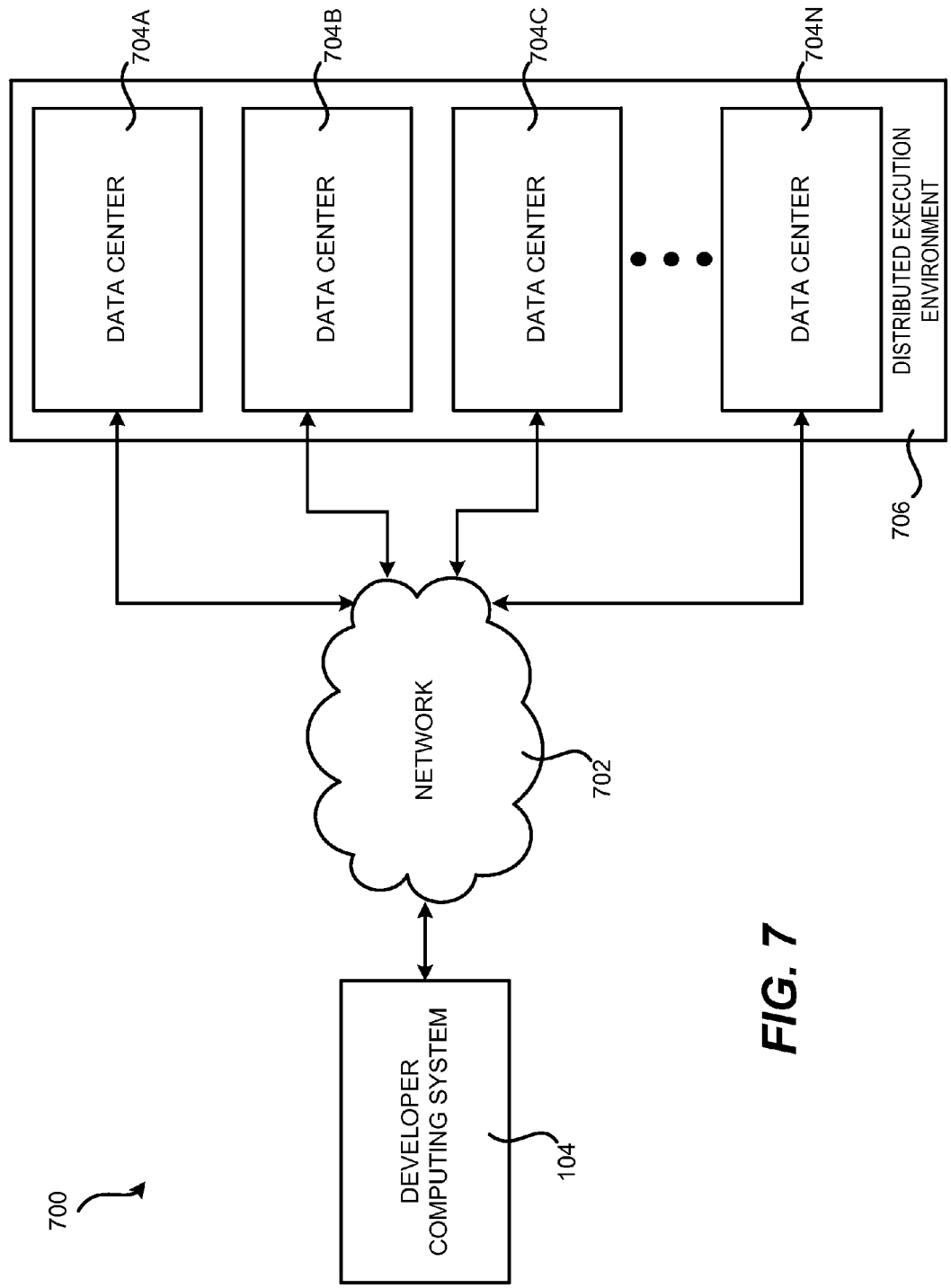
FIG. 7 is a system and network diagram that shows one illustrative operating environment in which the embodiments described herein may be implemented.

FIG. 7 and the following description are intended to provide a brief, general description of a suitable computing environment in which the embodiments described herein may be implemented. As briefly mentioned above, the functionality implemented by the application experiment system 108 may be provided as a service, such as a web service, for performing experiments on a software application 120 and identifying optimized experience configurations for the software application 120. FIG. 7 is a system and network diagram that shows an illustrative operating environment 700 that includes a distributed execution environment 706 configured for providing access to the service, according to one embodiment disclosed herein.

The distributed execution environment 706 can provide instances of computing resources on a permanent or an as-needed basis. The instances of computing resources provided by the distributed execution environment 706 may include various types of resources, such as data processing resources, data storage resources, data communication resources, and the like. Each type of computing resource may be general-purpose or may be available in a number of specific configurations. Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity.

Instances of data processing resources may be available as virtual machine instances in a number of different configurations. The virtual machine instances may be configured to execute applications, including Web servers, application servers, media servers, database servers, and other types of applications. Instances of data storage resources may include file storage devices, block storage devices, and the like. Instances of remote desktop sessions might also be utilized in various embodiments presented herein. A remote desktop session may be established utilizing the remote desktop protocol ("RDP") or another similar protocol for viewing and interacting with a graphical user interface provided by another computer. It should be understood that an instance may include any combination of the various types of resources described above.

The instances of computing resources provided by the distributed execution environment 706 are enabled in one implementation by one or more data centers 704A-704N (which may be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 might also be located in geographically disparate locations. One illustrative configuration for a data center 704 that implements the concepts and technologies disclosed herein for providing a service to perform experiments on a software application and to identify optimized experience configurations for the software application will be described below with regard to FIG. 8.

As a customer of the distributed execution environment 706, the developer 102, may access the computing resources provided by the data centers 704 over a network, such as the network 702, the Internet, or any other networking topology known in the art that connects the data centers 704 to the developer computing system 104 associated with the developer 102. It should also be appreciated that combinations of such networks might also be utilized.

The developer computing system 104 may be utilized to configure aspects of the computing resources provided by the distributed execution environment 706. In this regard, the distributed execution environment 706 might provide a Web interface through which aspects of its operation may be configured. For instances, a Web browser application program executing on the customer computing system 104 might be utilized to access the Web interface and configure the operation of the distributed execution environment 706. Alternatively, a stand-alone application program executing on the customer computing system 104 might access an application programming interface ("API") exposed by the distributed execution environment 706 for performing the configuration operations. Other mechanisms for configuring the operation of the distributed execution environment 706 might also be utilized.

Figure 8:
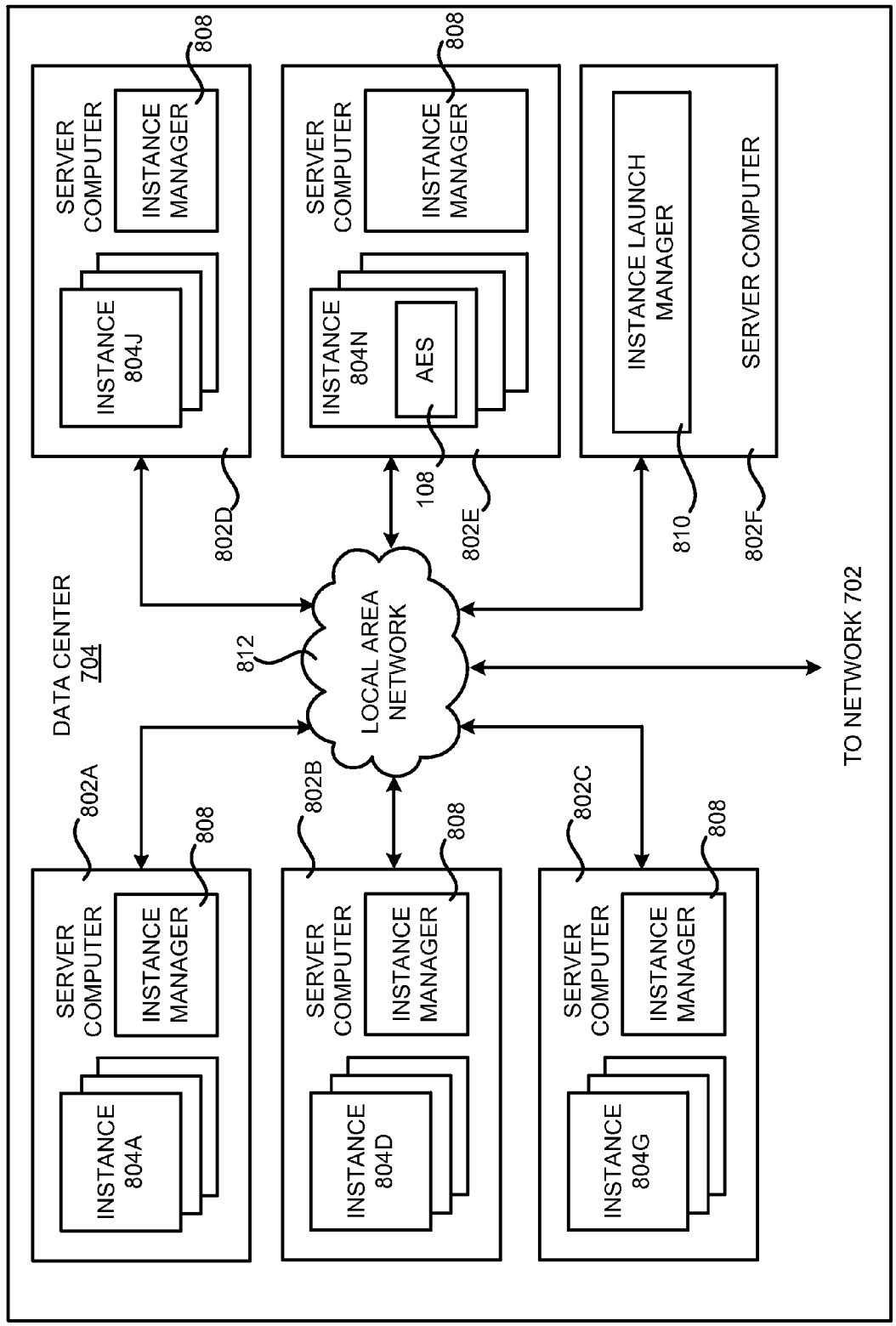
FIG. 8 is a computing system diagram that illustrates one configuration for a data center that implements aspects of the concepts and technologies disclosed herein for performing experiments on a software application and identifying optimized experience configurations for the software application, according to one embodiment disclosed herein.

FIG. 8 is a computing system diagram that illustrates one configuration for a data center 704 that implements the distributed execution environment 706, including the concepts and technologies disclosed herein for performing experiments on a software application and identifying optimized experience configurations for the software application. The example data center 704 shown in FIG. 8 includes several server computers 802A-802F (which may be referred to herein singularly as "a server computer 802" or collectively as "the server computers 802") for providing instances of computing resources. The server computers 802 may be standard tower or rack-mount server computers configured appropriately for providing the computing resources described herein. For example, in one implementation the server computers 802 are configured to provide instances 804A-804N.

In one embodiment, the instances 804A-804N (which may be referred herein singularly as "an instance 804" or in the plural as "the instances 804") are virtual machine instances. As known in the art, a virtual machine instance is an instance of a software implementation of a machine (i.e. a computer) that executes programs like a physical machine. Each of the servers 802 may be configured to execute an instance manager 808 capable of instantiating and managing the instances. In the case of virtual machine instances, for example, the instance manager 808 might be a hypervisor or another type of program configured to enable the execution of multiple virtual machine instances on a single server 802, for example. Each of the instances 804 may be configured to execute all or a portion of an application. According to one implementation, one or more instances 804 might be configured to execute the service provided by the application experiment system 108, as illustrated in FIG. 8. It should be appreciated that although the embodiments disclosed herein are described primarily in the context of virtual machine instances, other types of instances of computing resources can be utilized with the concepts and technologies disclosed herein.

The data center 704 shown in FIG. 8 also includes a server computer 802F reserved for executing software components for managing the operation of the data center 704, the server computers 802, the instances 804, and other resources within the distributed execution environment 706. In particular, the server computer 802F might execute the instance launch manager 810 to receive instance launch requests from one or more developer computing systems 104, and to instantiate one or more of the instances 804 in response to the requests.

In the example data center 704 shown in FIG. 8, an appropriate local area network ("LAN") 812 is utilized to interconnect the server computers 802A-802E and the server computer 802F. The LAN 812 is also connected to the network 702 illustrated in FIG. 7. It should be appreciated that the configuration and network topology illustrated in FIGS. 6 and 7 has been greatly simplified and that many more computing systems, networks, and networking devices may be utilized to interconnect the various computing systems disclosed herein. Appropriate load balancing devices or software modules might also be utilized for balancing a load between each of the data centers 804A-804N, between each of the server computers 802A-802F in each data center 704, and between instances 804 of computing resources provided by the distributed execution environment 706.

It should be appreciated that the data center 704 described in FIG. 8 is merely illustrative and that other implementations might be utilized. In particular, functionality described herein as being performed by the instance launch manager 810 might be performed by one or more other components. Additionally, it should be appreciated that the functionality provided by these components might be implemented in software, hardware, or a combination of software and hardware. Other implementations should be apparent to those skilled in the art.

Figure 9:
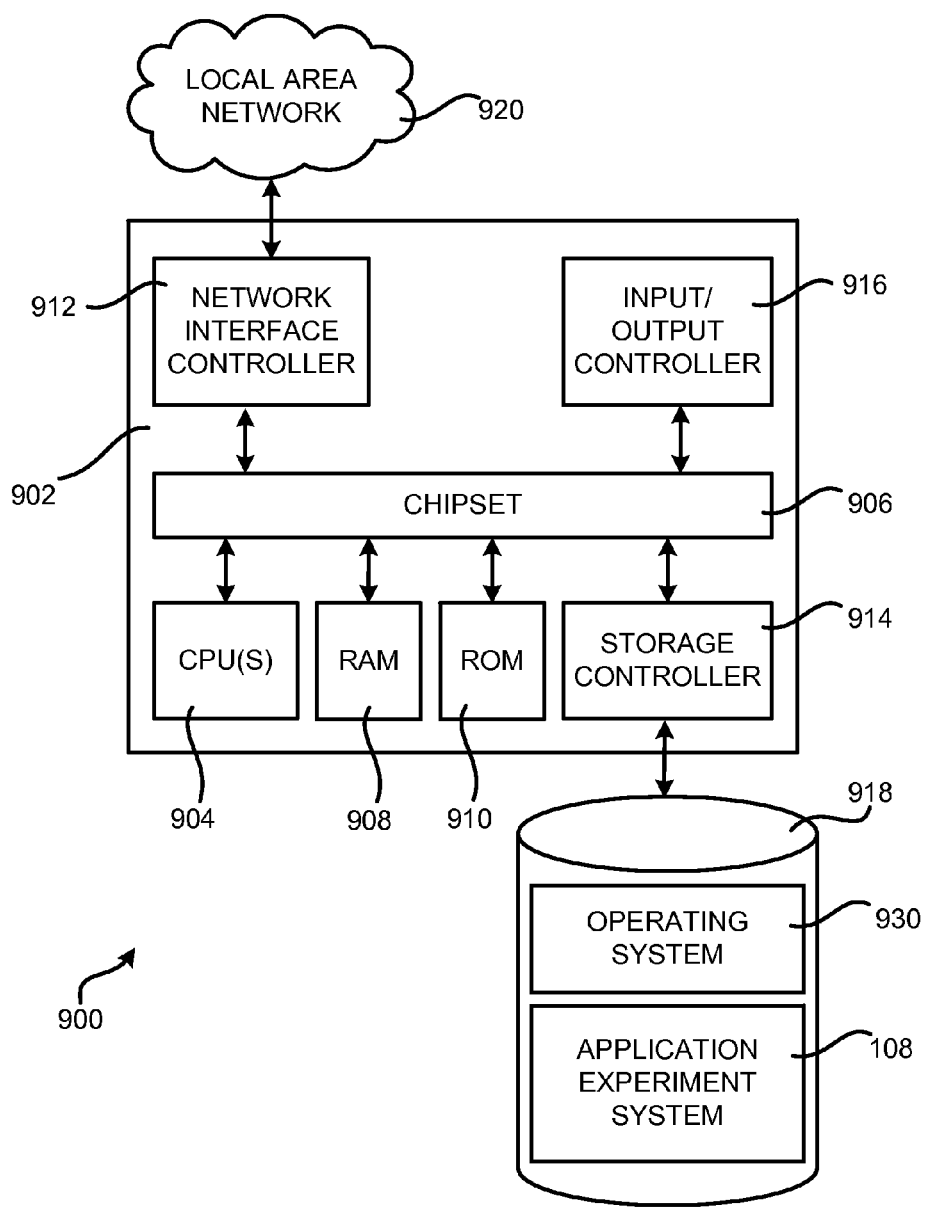
FIG. 9 is a computer architecture diagram showing one illustrative computer hardware architecture for implementing a computing device that might be utilized to implement aspects of the various embodiments presented herein.

FIG. 9 shows an example computer architecture for a computer 900 capable of executing the program components described above for performing experiments on a software application and identifying optimized experience configurations for the software application. The computer architecture shown in FIG. 9 illustrates a conventional server computer, workstation, desktop computer, laptop, tablet, network appliance, PDA, e-reader, digital cellular phone, or other computing device, and may be utilized to execute any aspects of the software components presented herein. For example, the computer architecture shown in FIG. 9 may be utilized to execute the application experiment system 108 shown in FIG. 1 and described above.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a random access memory ("RAM") 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 920. The chipset 906 may include functionality for providing network connectivity through a NIC 912, such as a gigabit Ethernet adapter. The NIC 912 is capable of connecting the computer 900 to other computing devices over the network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 918 may store other system or application programs and data utilized by the computer 900, such as modules implementing the functionalities provided by the application experiment system 108 and/or any the other software components and data described above. The mass storage device 918 might also store other programs and data not specifically identified herein.

In one embodiment, the mass storage device 918 or other computer-readable storage media is encoded with computer-executable instructions which, when loaded into the computer 900, transforms the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the routines described above with regard to FIGS. 3 and 4. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for performing experiments on a software application and identifying optimized experience configurations for the software application have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for performing an experiment on a software application, the method comprising performing computer-implemented operations for:

receiving an experiment configuration from a computing device associated with a developer of the software application, the experiment configuration comprising a test factor for the software application, a set of test values for the test factor, and an objective metric to be optimized in the experiment, the test factor representing a feature of the software application to be tested in the experiment;

determining an experiment strategy based at least in part upon the experiment configuration, the experiment strategy comprising a plurality of experience configurations of the software application, a number of rounds of the experiment, and two or more of the test values to be tested in individual rounds of the experiment, wherein the plurality of experience configurations comprise different application settings;

identifying a plurality of user computing devices associated with the software application and allocating the plurality of experience configurations to the plurality of user computing devices according to the experiment strategy, the plurality of experience configurations being used to configure corresponding instances of the software application executing on the plurality of user computing devices and individual ones of the plurality of experience configurations specifying one of the set of test values to be used as a value of the test factor in the corresponding instance of the software application;

causing a first round of the experiment to be performed on one or more of the plurality of user computing devices to test a first subset of test values;

analyzing experiment data related to the first round of the experiment to identify a sub-optimized test value from among the first subset of the test values based on the objective metric;

including the sub-optimized test value into a second subset of the test values to be tested in a second round of the experiment;

causing the remaining experiment to be performed and collecting additional experiment data related to the experiment; and analyzing the additional experiment data to identify an optimized test value for the test factor from among the set of test values based on the objective metric.

2. The computer-implemented method of claim 1, wherein the experiment strategy further comprises a user assignment for allocating one or more of the plurality of experience configurations corresponding to the first subset of the test values to corresponding user computing devices.

3. The computer-implemented method of claim 1, wherein determining the experiment strategy comprises:
estimating a number of users available for participating in the experiment;
determining that the estimated number of users is not large enough for the experiment; and
in response to determining that the estimated number of users is not large enough, selecting a subset of test values from the set of test values for the experiment, wherein individual ones of the plurality of experience configurations specify a test value from the subset of test values for use as the value of the test factor in the corresponding instance of the software application.

4. The computer-implemented method of claim 3, wherein the experiment configuration further comprises a priority assigned to individual ones of the set of test values, and the selection of the subset of test values is based on the priority.

5. A computer system for identifying an optimized experience configuration for a software application through an experiment on the software application, the system comprising:
at least one computing device executing an application experiment system configured to
receive an experiment configuration from a computing device associated with a developer of the software application, the experiment configuration comprising a test factor for the software application, a set of test values for the test factor, and an objective metric to be optimized in the experiment, the test factor representing feature of the software application to be tested in the experiment;

determine an experiment strategy based at least in part upon the experiment configuration, the experiment strategy comprising a plurality of experience configurations of the software application, a number of rounds of the experiment, and two or more of the test values to be tested in individual rounds of the experiment, wherein the plurality of experience configurations comprise different application settings;

identify a plurality of user computing devices associated with the software application and allocate the plurality of experience configurations to the plurality of user computing devices according to the experiment strategy, the plurality of experience configurations being used to configure corresponding instances of the software application executing on the plurality of user computing devices and individual ones of the plurality of experience configurations specifying one of the set of test values to be used as a value of the test factor in the corresponding instance of the software application;

cause a first round of the experiment to be performed on one or more of the plurality of user con devices to test a first subset of test values;

analyze experiment data related to the first round of the experiment to identify a sub-optimized test value from among the first subset of the test values based on the objective metric;

include the sub-optimized test value into a second subset of the test values to be tested in a second round of the experiment;

cause the remaining experiment to be performed and collect additional experiment data related to the experiment; and analyze the additional experiment data to identify an optimized test value for the test factor from among the set of test values based on the objective metric.

6. The computer system of claim 5, wherein the at least one computing device implements the application experiment system as a service.

7. The computer system of claim 5, wherein the one or more test values for one of the test factors corresponds to a numerical range, and wherein determining the experiment strategy comprises:
dividing the numerical range into one or more regions;
selecting a test value from individual ones of the one or more regions, wherein the selection of the test value is based on experiment data obtained for test values in a corresponding region.

8. The computer system of claim 7, wherein the at least one computing device executing the application experiment system is further configured to identify sub-optimized experiment configurations for individual ones of the one or more regions, wherein the optimized experience configuration is identified based on the sub-optimized experiment configurations.

9. The computer system of claim 7, wherein the selection of the test value is based on objective metrics calculated from the experiment data.

10. A non-transitory computer-readable storage medium having computer-executable instructions stored thereupon which, when executed by a computer, cause the computer to:

receive an experiment configuration from a computing device associated with a developer of a software application, the experiment configuration comprising a test factor for the software application, a set of test values for the test factor, and an objective metric to be optimized in the experiment, the test factor representing a feature of the software application to be tested in the experiment;

determine an experiment strategy based at least in part upon the experiment configuration, the experiment strategy comprising a plurality of experience configurations of the software application, a number of rounds of the experiment, and two or more of the test values to be tested in individual rounds of the experiment, wherein the plurality of experience configurations comprise different application settings;

identify a plurality of user computing devices associated with the software application and allocate the plurality of experience configurations to the plurality of user computing devices according to the experiment strategy, the plurality of experience configurations being used to configure corresponding instances of the software application executing on the plurality of user computing devices and individual ones of the plurality of experience configurations specifying one of the set of test values to be used as a value of the test factor in the corresponding instance of the software application;

cause a first round of the experiment to be performed on one or more of the plurality of user computing devices to test a first subset of test values;

analyze experiment data related to the first round of the experiment to identify a sub-optimized test value from among the first subset of the test values based on the objective metric;

include the sub-optimized test value into a second subset of the test values to be tested in a second round of the experiment;

cause the remaining experiment to be performed and collect additional experiment data related to the experiment; and analyze the additional experiment data to identify an optimized test value for the test factor from among the set of test values based on the objective metric.

11. The computer-readable storage medium of claim 10, wherein the experiment strategy comprises a subset of the test values to be tested in a round of the experiment, the subset of the test values being determined based on experiment data obtained in one or more previous rounds of the experiment, a set of experience configurations generated based on the subset of the test values, and a user assignment for allocating the set of experience configurations to corresponding user computing devices.

12. The computer-readable storage medium of claim 10, wherein determining the experiment strategy comprises:
estimating a number of users available for the experiment;
determining that the estimated number of users is large enough for the experiment; and
in response to determining that the estimated number of users is not large enough, selecting a subset of experience configurations from experience configurations to be tested in the experiment, wherein the subset of experience configurations comprises the one or more experience configurations allocated to the plurality of user computing devices.

13. The computer-readable storage medium of claim 12, wherein the selection of the subset of the experience configurations is based on a priority specified in the experiment configuration.

14. The computer-implemented method of claim 1, wherein the one or more test values for one of the test factors corresponds to a numerical range, and wherein determining the experiment strategy comprises:
dividing the numerical range into one or more regions;
selecting a test value from individual ones of the one or more regions, wherein the selection of the test value is based on experiment data obtained for test values in a corresponding region.

15. The computer-implemented method of claim 14, further comprising identifying sub-optimized experiment configurations for individual ones of the one or more regions, wherein the optimized experience configuration is identified based on the sub-optimized experiment configurations.

16. The computer-implemented method of claim 14, wherein the selection of the test value is based on objective metrics calculated from the experiment data.

17. The computer system of claim 5, wherein determining the experiment strategy comprises:
estimating a number of users available for participating in the experiment;
determining that the estimated number of users is not large enough for the experiment; and
in response to determining that the estimated number of users is not large enough, selecting a subset of test values from the set of test values for the experiment, wherein individual ones of the plurality of experience configurations specify a test value from the subset of test values for use as the value of the test factor in the corresponding instance of the software application.

18. The computer system of claim 17, wherein the experiment configuration further comprises a priority assigned to individual ones of the set of test values, and the selection of the subset of test values is based on the priority.

19. The computer-readable storage medium of claim 10, wherein the one or more test values for one of the test factors corresponds to a numerical range, and wherein determining the experiment strategy comprises:
dividing the numerical range into one or more regions;
selecting a test value from individual ones of the one or more regions, wherein the selection of the test value is based on experiment data obtained for test values in a corresponding region.

20. The computer-readable storage medium of claim 19, having further computer-executable instructions to cause the computer to identify sub-optimized experiment configurations for individual ones of the one or more regions, wherein the optimized experience configuration is identified based on the sub-optimized experiment configurations.

* * * * *